United States Patent Office 3,364,212
Patented Jan. 16, 1968

3,364,212
DERIVATIVES OF 7-AMINOCEPHALOSPORANIC ACID
Arthur A. Patchett, Metuchen, N.J., assignor to Merck & Co., Inc., Rahway, N.J., a corporation of New Jersey
No Drawing. Filed Jan. 16, 1962, Ser. No. 166,681
6 Claims. (Cl. 260—243)

This invention relates to derivatives of 7-aminocephalosporanic acid and related compounds and, more particularly to aminoacyl derivatives of 7-cephalosporanic acid having enhanced antibiotic activity.

The antibiotic substance cephalosporin C and its preparation by fermentation of suitable species of cephalosporin has been described in the art. The antibiotic is active against gram positive and gram negative bacteria. Upon acid treatment of the antibiotic cephalosporin C, the molecule may be split into two parts, a side-chain which is a α-amino adipic acid and a nucleus given the name 7-aminocephalosporanic acid which has the following structure:

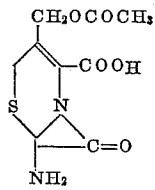

What has been discovered herein is that certain aminoacyl derivatives of 7-aminocephalosporin C have enhanced broad spectrum antibiotic activity against bacteria.

Accordingly, it is an object of the present invention to provide novel derivatives of cephalosporin C having enhanced activity.

Another object of this invention is to provide aminoacyl derivatives of 7-aminocephalosporanic acid.

A further object of the instant invention is to provide a process for making these derivatives.

These and other objects will be made apparent in the following more detailed description of this invention as illustrated in the embodiments thereof.

In accordance with the present invention, there is provided new cephalosporin derivatives having valuable antibiotic activity by introducing aminoacyl substituent groups into the amino group of 7-aminocephalosporin acid.

Accordingly, the present invention is concerned with novel cephalosporin derivatives of the general formula:

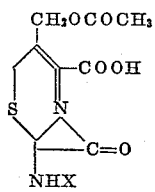

where X is an amino-substituted acyl group containing up to 20 carbon atoms and being selected from among the following:

(1)    R(CH$_2$)$_n$CHCO—
           |
           NH$_2$ where R is hydrogen or an amino, carboxyl or substituted alkyl, aryl, aralkyl or heterocyclic group and $n$ is zero or an integer and non-toxic salts thereof.

(2)    HOOC(CH$_2$)$_n$CHCO— and
              |
              NH$_2$ (3)    H$_2$N(CH$_2$)$_n$CHCO—
              |
              NH$_2$ The compounds of the present invention have considerably enhanced broad spectrum activity. In addition they have the further advantage of being active against penicillin resistant strains of bacteria that release penicillinase.

The salts are non-toxic salts including non-toxic metallic salts such as sodium, potassium, calcium and aluminum, the ammonium salts and substituted ammonium salts, e.g. salts of such non-toxic amines as trialkylamines, including triethylamine, procaine, dibenzylamine, N-benzyl-beta-phenethylamine, 1-ephenamine, N,N¹-dibenzylethylenediamine, dehydroabietylamine, N,N¹-bis-dehydroabietyl-ethylenediamine, and other amines which may be used to form salts therewith.

Examples of the first group of derivatives wherein X in the general formula is

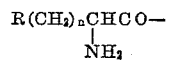

include derivatives of the amino acids, alanine, valine, nor-valine, leucine, iso-leucine, phenylalanine, tyrosine, tryptophane, threonine, histidine, asparagine, nor-leucine, and glutamine. A preferred class of compound falling within this group is when $n$ is zero and R is phenyl, chlorophenyl, methoxphenyl, furyl or cyclohexy group. This class will include 7-(2-amino-2-phenylacetamido) cephalosporanic acid.

Included in the second group of compounds are derivatives of aspartic acid, glutamic acid and α-aminoadipic acid.

The third group of compound wherein $n$ is an integer from 1 to 4 will include derivatives of lysine and ornithine.

The preparation of cephalosporin derivatives of the general formula where X is as herein-before defined, and non-toxic salts thereof, comprises coupling 7-aminocephalosporanic acid, or a salt thereof, with an acid of the general formula XOH having its amino group or groups protected and thereafter removing the protecting group or groups under sufficiently mild conditions to avoid destruction of the cephalosporin nucleus.

The majority of the derivatives mentioned above contain at least one asymmetric carbon atom and will exist in D- and L-forms. It is to be understood that the present invention includes both the D- and L-forms and the DL-mixture. When the derivative contains two asymmetric carbon atoms then there will be four isomers and two DL-mixtures.

The protected aminoacyl derivatives of 7-aminocephalosporanic acid are preferably prepared by reacting 7-aminocephalosporanic acid with a mixed anhydride prepared by reacting the amino-substituted carboxylic acid or a salt thereof, having its amino group or groups protected, with an ester of chlorocarbonic acid, e.g. ethyl chlorocarbonate.

Other methods used to form the protected aminoacyl derivative of 7-aminocephalosporanic acid are standard procedures employed in peptide synthesis and include the use of a reactive acid azide or a carbodi-imide reagent (cf. Sheehan and Hess, J. Amer. Chem. Soc., 1955, 77, 1067).

The subsequent removal of the protecting group or groups, to form the free amino-substituted cephalosporanic acid may be effected by catalytic hydrogenation and suitable protecting groups are of the general formula R¹¹O.CO—, where R¹¹ is an allyl, benzyl, substituted benzyl, or the trityl group PH$_3$C—. The abbreviation "Ph" as used herein represents the phenyl group.

The removal of the protecting group or groups is effected by allowing the protected aminoacyl derivative to react with hydrogen in the presence of a catalyst. This hydrogenation is normally carried out at room temperature and at atmospheric pressure, the pH of the reaction mixture being from 5 to 9. The solvent for the hydrogenation reaction is normally water, but other non-reducible solvents such as ethyl alcohol or dioxane or mixtures of these with water may be employed.

The preferred hydrogenation catalyst is palladium but other catalysts such as platinum or rhodium may be used. The catalyst is preferably employed on an inert support, e.g. of barium carbonate, barium sulfate or carbon. It may be necessary to hydrogenate in the presence of two or more successive portions of catalyst.

When the amino-substituted carboxylic acid contains more than one carboxyl group, e.g. α-aminoadipic acid, in order to prepare an unambiguous acyl derivative it is necessary either to protect one of the carboxyl groups before reaction with 7-aminocephalosporanic acid or to prepare an unambiguous reactive derivative of one carboxyl group only.

Since some of the antibiotic substances obtained by the process of this invention are relatively unstable compounds which readily undergo chemical changes resulting in the loss of antibiotic activity, it is desirable to choose reaction and isolation conditions which are sufficiently moderate to avoid their decomposition.

The following examples will more fully illustrate the invention:

*Example I.—7-[D-(—)-(2-amino-2-phenylacetamido)] cephalosporanic acid*

The starting material 7-aminocephalosporanic acid is prepared in the following manner. The sodium salt of cephalosporin C (2 grams) is dissolved in 30 ml. of water, the pH is adjusted to 2.5 by addition of Dowex 50 x 8 ($H^+$), the resin filtered and washed with 10 ml. water, and 10.2 ml. N—HCl added to the combined filtrate and washings. The solution is kept at 20° for 3 days and added to a column of Dowex-1 (acetate form), 2.1 cm. diam. x 7 cm. The percolate is collected in 5 ml. fractions (1 to 12) and the column is eluted with water until a total of 34 fractions has been collected. Elution is then begun with 0.5 N acetic acid and an additional 66 fractions is collected. Fractions 36–45 contain most of the desired product, 7-aminocephalosporanic acid.

7-[D-(—)-2-carbobenzyloxyamino-2-phenylacetamido] cephalosporanic acid is prepared in the following manner. Ethyl chlorocarbonate (0.2 ml.) in 1 ml. of dry acetone is added dropwise to an ice-salt cooled solution of D-(—)-2-carbobenzyloxyaminophenylacetic acid (610 mg.) and triethyl amine (0.3 ml.) in 9 ml. of dry acetone. After 10 minutes 1 ml. of this solution containing the mixed anhydride is added slowly to an ice-cold solution of 7-aminocephalosporanic acid (55 mg.) in 4 ml. of water and 1 ml. of acetone containing 25 mg. of sodium bicarbonate. After an hour of stirring at room temperature the mixture is diluted with several ml. of water and is washed with ether. The aqueous layer is cooled at 0° and carefully acidified to pH 2 with 2 M phosphoric acid. The cephalosporin derivative is extracted with a total of 9 ml. of butanol in three successive extractions. The combined butanol layers are extracted twice with a little water and then the cephalosporin derivative is brought into water by successive extractions with 2 ml. of water to which sufficient dilute sodium bicarbonate is added to bring the combined aqueous layers to a pH of about 7. This aqueous solution is washed with ether and lyophilized to yield the crude sodium salt of 7-[D-(—)-2-carbobenzyloxyamino - 2 - phenylacetamido]cephalosporanic acid.

Removal of the carbobenzyloxy protecting group is accomplished as follows. The sodium salt of 7-[D-(—)-2-carbobenzyloxyamino - 2 - phenylacetamid]cephalosporanic acid (35 mg.) is added to a suspension of 125 mg. of prereduced 10% palladium on barium sulfate catalyst in 5 ml. of water. This mixture is shaken under hydrogen for one hour whereupon an additional 75 mg. of prereduced catalyst is added and the hydrogenation is continued for an additional hour. The catalyst is then filtered off and the aqueous solution is lyopholized after being adjusted to pH 7 with a small amount of dilute hydrochloric acid. The residue after lyopholization contains 7-[D-(—)-(2- amino- 2 - phenylacetamido)]cephalosporanic acid.

*Example II*

Following the procedure described in detail above and using DL-2-carbobenzyloxyaminophenylacetic acid in place of D-(—)-2-carbobenzylaminophenylacetic acid there is produced the corresponding 7-(DL-2-amino-2-phenylacetamido)cephalosporanic acid.

*Example III.—7-[2-amino-2-(1-naphthyl)acetamido] cephalosporanic acid*

Following the procedure described in detail above and using 2-carbobenzyloxyamino-2-[1-naphthyl]acetic acid in place of D-(—)-2-carbobenzyloxyaminophenylacetic acid, there is produced the corresponding 7-[2-amino-2-(1-naphthyl)acetamido]cephalosporanic acid.

*Example IV.—7-(2-amino-octanamido)cephalosporanic acid*

Following the procedure described in detail above and using 2-carbobenzyloxyaminooctanoic acid in place of carbobenzyloxyaminophenylacetic acid, there is produced the corresponding 7 - (2-amino-octanamido)cephalosporanic acid.

*Example V*

Following the procedure described in the above examples there is obtained by the hydrogenation of the corresponding carbobenzyloxy derivative, the following compounds, 7 - (2-amino-3-hydroxy-2-phenylpropionamido) cephalosporanic acid, 7 - (2-amino-2-(3-indolyl)acetamido)cephalosporanic acid, 7-[2-amino-2-(2-furyl)acetamido]cephalosporanic acid, 7-(5-carboxy-2,4-diaminopentanamido)cephalosporanic acid and 7-(1-aminocyclohexane-1-carboxamido)cephalosporanic acid.

While this invention has been described to certain embodiments thereof, it will be understood by those skilled in the art that modifications may be made which are within the spirit and scope of the invention.

What is claimed is:

1. 7-(2-amino-octamido)cephalosporanic acid.
2. 7 - (2 - amino-3-hydroxy-2-phenyl-propionamido) cephalosporanic acid.
3. 7 - (2 - amino-2-(3-indolyl)acetamido)cephalosporanic acid.
4. 7 - (2 - amino-(2-furyl)acetamido)cephalosporanic acid.
5. 7 - (5 - carboxy-2,4-diaminopentanamido)cephalosporanic acid.
6. 7 - (1 - aminocyclohexane - 1-carboxamido)cephalosporanic acid.

References Cited

Burger, Medical Chemistry, p. 46 (1960).
Wertheim, Textbook of Organic Chemistry, pp. 763–764 (1945).
Jour. Amer. Med. Assoc., p. 466, May 24, 1958.

NICHOLAS S. RIZZO, *Primary Examiner.*

J. W. ADAMS, *Assistant Examiner.*